(12) United States Patent
Bhardwaj

(10) Patent No.: US 7,761,198 B2
(45) Date of Patent: Jul. 20, 2010

(54) METHODS AND SYSTEMS FOR POWER SYSTEM MANAGEMENT

(75) Inventor: Ramesh Chandra Bhardwaj, Fairview, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/821,723

(22) Filed: Jun. 25, 2007

(65) Prior Publication Data

US 2008/0319593 A1 Dec. 25, 2008

(51) Int. Cl.
*G05D 1/00* (2006.01)
*G05D 3/00* (2006.01)
*G06F 7/00* (2006.01)
*G06F 17/00* (2006.01)

(52) U.S. Cl. .............. 701/19; 701/36; 104/34; 105/50; 204/196.04; 204/196.07; 204/196.01; 320/103; 320/104; 320/107; 320/108; 320/109; 320/110; 320/111; 320/112; 320/113; 322/88; 290/16; 290/50; 307/10.7; 307/43; 307/47; 307/48; 307/45; 307/46; 307/66; 29/623.5; 29/730; 29/763; 340/7.32; 340/855.8; 702/63; 318/139; 323/284; 903/903; 903/907

(58) Field of Classification Search .......... 701/19, 701/36; 104/34; 105/50; 200/84; 204/196.4, 204/196.7, 196.1; 320/103, 104, 107–113, 320/DIG. 19, DIG. 21, FOR. 100, FOR. 101, 320/FOR. 110, FOR. 132, FOR. 171; 322/88; 290/16, 50; 307/10.7, 43, 47, 48, 45, 46, 307/66; 29/623.5, 730, 763; 340/7.32, 855.8, 340/FOR. 383, FOR. 403; 702/63; 903/903, 903/907, 943

See application file for complete search history.

(56) References Cited

U.S. PATENT DOCUMENTS

| | | | | |
|---|---|---|---|---|
| 4,342,921 A | * | 8/1982 | Williams | 290/2 |
| 5,002,840 A | * | 3/1991 | Klebenow et al. | 429/9 |
| 5,130,659 A | * | 7/1992 | Sloan | 324/435 |
| 5,162,164 A | * | 11/1992 | Dougherty et al. | 429/9 |
| 5,162,720 A | * | 11/1992 | Lambert | 320/104 |
| 5,204,610 A | * | 4/1993 | Pierson et al. | 320/126 |
| 5,223,351 A | * | 6/1993 | Wruck | 429/9 |
| 5,280,232 A | * | 1/1994 | Kohl et al. | 322/23 |
| 5,316,868 A | * | 5/1994 | Dougherty et al. | 429/9 |
| 5,321,627 A | * | 6/1994 | Reher | 702/63 |
| 5,428,961 A | * | 7/1995 | Sakakibara et al. | 60/698 |
| 5,525,891 A | * | 6/1996 | Meyer et al. | 320/128 |
| 5,549,984 A | * | 8/1996 | Dougherty | 429/61 |

(Continued)

*Primary Examiner*—Khoi Tran
*Assistant Examiner*—Jorge O Peche
(74) *Attorney, Agent, or Firm*—John A. Kramer, Esq.; Armstrong Teasdale LLP

(57) ABSTRACT

Methods and systems for energy management system for a vehicle are provided. The system includes a first power source configured for cranking an engine wherein the first power source includes a switch configured to electrically couple the first power source to a starter for the engine and wherein the first power source is electrically isolated from auxiliary onboard loads. The system further includes a second power source configured for supplying auxiliary on board loads, a charging subsystem electrically coupled to the first and the second power sources. The charging subsystem is configured to supply charging current to the first and the second power sources. The system further includes a controller configured to maintain the first power source in a substantially fully charged condition and supply the auxiliary loads from the second power source.

17 Claims, 3 Drawing Sheets

U.S. PATENT DOCUMENTS

| | | | |
|---|---|---|---|
| 5,635,771 A * | 6/1997 | Mertl et al. | 307/10.7 |
| 5,672,953 A * | 9/1997 | Kim | 320/163 |
| 5,691,619 A * | 11/1997 | Vingsbo | 361/86 |
| 5,739,668 A * | 4/1998 | Nishikiori | 320/111 |
| 5,744,963 A * | 4/1998 | Arai et al. | 324/427 |
| 5,767,658 A * | 6/1998 | Hayes | 320/104 |
| 5,798,646 A * | 8/1998 | Arai | 324/427 |
| 5,886,418 A * | 3/1999 | Kondo et al. | 307/9.1 |
| 5,886,419 A * | 3/1999 | Saito et al. | 307/10.1 |
| 5,938,114 A * | 8/1999 | Zeyen et al. | 237/12.3 R |
| 5,977,744 A * | 11/1999 | Williams et al. | 320/104 |
| 6,023,137 A | 2/2000 | Kumar et al. | |
| 6,109,229 A * | 8/2000 | Pels | 123/179.6 |
| 6,121,750 A * | 9/2000 | Hwa et al. | 320/104 |
| 6,202,615 B1 * | 3/2001 | Pels et al. | 123/179.3 |
| 6,242,887 B1 | 6/2001 | Burke | |
| 6,271,642 B1 * | 8/2001 | Dougherty et al. | 320/104 |
| 6,317,697 B1 * | 11/2001 | Yoshikawa et al. | 702/63 |
| 6,336,689 B1 * | 1/2002 | Eguchi et al. | 303/187 |
| 6,362,595 B1 | 3/2002 | Burke | |
| 6,415,897 B1 * | 7/2002 | Sugimoto et al. | 188/353 |
| 6,515,455 B2 * | 2/2003 | Hidaka | 320/135 |
| 6,650,993 B2 | 11/2003 | Wolf et al. | |
| 6,671,591 B2 | 12/2003 | Wolf et al. | |
| 6,671,612 B2 * | 12/2003 | Fuse | 701/112 |
| 6,762,926 B1 | 7/2004 | Shiue et al. | |
| 6,819,010 B2 | 11/2004 | Burke | |
| 6,885,951 B2 * | 4/2005 | Richter | 702/63 |
| 6,888,266 B2 * | 5/2005 | Burke et al. | 307/10.6 |
| 6,941,218 B2 | 9/2005 | Wolf et al. | |
| 6,949,911 B2 * | 9/2005 | Laig-Hoerstebrock et al. | 320/132 |
| 6,967,466 B2 * | 11/2005 | Koch | 320/132 |
| 6,979,977 B2 * | 12/2005 | Amano et al. | 320/104 |
| 7,053,504 B2 * | 5/2006 | Ketteler | 307/72 |
| 7,061,246 B2 * | 6/2006 | Dougherty et al. | 324/426 |
| 7,131,614 B2 | 11/2006 | Kisak et al. | |
| 7,178,499 B2 | 2/2007 | Wolf et al. | |
| 7,279,805 B2 * | 10/2007 | Senda et al. | 307/10.1 |
| 7,317,300 B2 * | 1/2008 | Sada et al. | 320/136 |
| 7,336,002 B2 * | 2/2008 | Kato et al. | 307/10.6 |
| 7,450,361 B2 * | 11/2008 | Ito et al. | 361/93.1 |
| 7,612,535 B2 * | 11/2009 | Streuer | 320/132 |
| 2002/0183901 A1 | 12/2002 | Wolf et al. | |
| 2002/0183917 A1 | 12/2002 | Wolf et al. | |
| 2004/0122586 A1 | 6/2004 | Wolf et al. | |
| 2004/0245410 A1 | 12/2004 | Kisak et al. | |
| 2005/0022784 A1 | 2/2005 | Wolf et al. | |
| 2005/0027411 A1 | 2/2005 | Meltser et al. | |
| 2005/0122071 A1 * | 6/2005 | King et al. | 318/139 |
| 2006/0025902 A1 * | 2/2006 | Brown et al. | 701/19 |
| 2006/0097577 A1 * | 5/2006 | Kato et al. | 307/10.1 |
| 2007/0104981 A1 | 5/2007 | Lam et al. | |
| 2007/0144398 A1 * | 6/2007 | Kumar et al. | 105/50 |
| 2007/0145922 A1 * | 6/2007 | Ito et al. | 318/300 |
| 2007/0273211 A1 * | 11/2007 | Wang et al. | 307/45 |
| 2008/0067973 A1 * | 3/2008 | Ishikawa et al. | 320/104 |
| 2008/0093138 A1 * | 4/2008 | Glonner et al. | 180/65.2 |
| 2008/0176117 A1 * | 7/2008 | Koike | 429/14 |

* cited by examiner

METHODS AND SYSTEMS FOR POWER SYSTEM MANAGEMENT

BACKGROUND

This invention relates generally to an energy storage system, and more particularly to a method and apparatus for managing power sources in a vehicle.

At least some known vehicles, for example, railroad locomotives are equipped with systems for automatically starting and stopping their engines when one or more conditions exist. The primary purpose of such systems is to conserve fuel, thereby lowering fuel costs while also preserving precious energy resources. For instance, a locomotive may be configured to automatically shutdown after operating for a certain amount of time in a parked idle state to prevent the locomotive from needlessly wasting fuel. The locomotive may then automatically restart when, for example, an operator signals an intention to motor the locomotive, such as by moving a direction controller (known as a reverser) from a center position (that is, from a "neutral" position). A locomotive may also be configured to automatically restart a certain amount of time following an automatic shutdown, such as two or four hours, or when other conditions exist.

The automatic engine start and stop (AESS) system described above has been implemented not only in locomotives which operate independently, but also in multiple locomotives that operate together (i.e., in consist) for providing cumulative (or reserve) towing capacity. The front locomotive in the consist is usually designated the lead unit while the other locomotives are designated trail units. Each trail unit typically receives a trainline or radio signal representing the position of the lead unit's reverser, and treats that signal as representing the position of its own reverser (which is typically placed in the center position when configuring the locomotive for trail unit operation). In the case where a locomotive's reverser must be in the center position to enable the AESS system, placing the lead unit's reverser in the center position will allow the AESS system to be enabled in each locomotive in the consist. Similarly, in the case where moving an automatically shutdown locomotive's reverser from the center position induces an automatic engine restart, moving the reverser in an automatically shutdown lead unit from the center position induces an automatic restart for each automatically shutdown locomotive in the consist. To start the diesel engine, locomotives include an energy storage system that is utilized to start the diesel engine and to provide electrical power to various devices installed on the locomotive. During operation, an alternator driven by the diesel engine, continuously recharges the energy storage system to ensure that the energy storage system remains charged to a predetermined voltage level.

However, when the diesel engine is not running, the energy storage system may still be utilized to provide power to the various electrical loads. As a result, the voltage level of the energy storage system may decrease to a voltage level that is insufficient to start the diesel engine. In this case, a road failure alert may be issued instructing maintenance personnel that the energy storage system requires charging before the diesel may be started and the locomotive is placed back in service. Additionally, the voltage drain on the energy storage system, caused by the connected loads, may be sufficient to cause the energy storage system to fail, i.e. the energy storage system is unable to hold a charge when connected to a charging system.

SUMMARY

In one embodiment, an energy management system for a vehicle includes a first power source configured for cranking an engine wherein the first power source includes a switch configured to electrically couple the first power source to a starter for the engine and wherein the first power source is electrically isolated from auxiliary onboard loads. The system further includes a second power source configured for supplying auxiliary on board loads, a charging subsystem electrically coupled to the first and the second power sources. The charging subsystem is configured to supply charging current to the first and the second power sources. The system further includes a controller configured to maintain the first power source in a substantially fully charged condition and supply the auxiliary loads from the second power source.

In yet another embodiment, a method of managing a plurality of power sources includes supplying cranking power to an engine starter from a cranking power source and an auxiliary power source, preferentially charging the cranking power source after the engine is started, and securing the engine after a predetermined idling period of time. The method also includes supplying electrical power to a plurality of auxiliary loads from the auxiliary power source, and electrically isolating the cranking power source from the auxiliary loads when the engine is secured.

In another embodiment, a train locomotive including an engine, a power source utilized to start the engine wherein the power source is configured to supply power to a non essential bus and an essential bus, and a controller coupled to the power source wherein the controller is programmed to disconnect at least one of the non essential bus and the essential bus after at least one of a predetermined time and a predetermined power source condition when the engine is not operating.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of managing the power depletion and recharging of a vehicle power source. However, it is contemplated that this disclosure has general application to managing and conserving power for any system that uses stored and or generated power.

Figure 1:
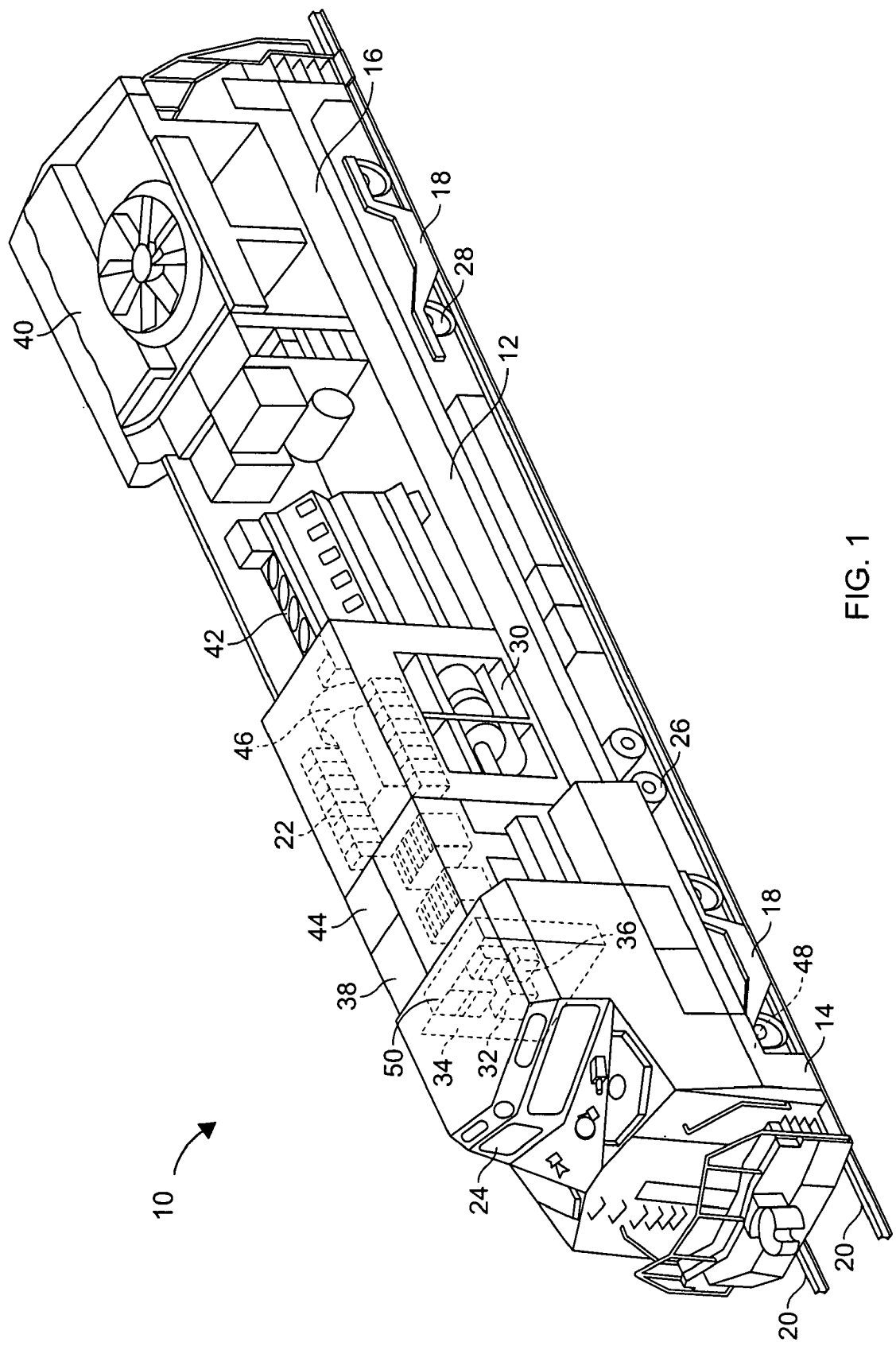
FIG. 1 is a partial cut away view of an exemplary Off-Highway Vehicle (OHV) in accordance with an embodiment of the present invention.

FIG. 1 is a partial cut away view of an exemplary Off-Highway Vehicle (OHV). In the exemplary embodiment, the OHV is a locomotive 10. Locomotive 10 includes a platform 12 having a first end 14 and a second end 16. A propulsion system 18, or truck is coupled to platform 12 for supporting, and propelling platform 12 on a pair of rails 20. An equipment compartment 22 and an operator cab 24 are coupled to platform 12. An air and air brake system 26 provides compressed air to locomotive 10, which uses the compressed air to actuate a plurality of air brakes 28 on locomotive 10 and railcars (not shown) behind it. An auxiliary alternator system 30 supplies power to all auxiliary equipment and is also utilized to recharge one or more on-board power sources. An intra-consist communications system 32 collects, distributes, and displays consist data across all locomotives in a consist.

A cab signal system 34 links the wayside (not shown) to a train control system 36. In particular, system 34 receives coded signals from a pair of rails 20 through track receivers (not shown) located on the front and rear of the locomotive. The information received is used to inform the locomotive operator of the speed limit and operating mode. A distributed power control system 38 enables remote control capability of multiple locomotive consists coupled in the train. System 38 also provides for control of tractive power in motoring and braking, as well as air brake control.

An engine cooling system 40 enables engine 42 and other components to reject heat to cooling water. In addition, system 40 facilitates minimizing engine thermal cycling by maintaining an optimal engine temperature throughout the load range, and facilitates preventing overheating in tunnels. An equipment ventilation system 44 provides cooling to locomotive 10 equipment.

A traction alternator system 46 converts mechanical power to electrical power which is then provided to propulsion system 18. Propulsion system 18 enables locomotive 10 to move and includes at least one traction motor 48 and dynamic braking capability. In particular, propulsion system 18 receives power from traction alternator 46, and through traction motors 48 moves locomotive 10. Locomotive 10 systems are monitored and/or controlled by an energy management system 50.

Energy management system 50 generally includes at least one computer that is programmed to perform the functions described herein. Computer, as used herein, is not limited to just those integrated circuits referred to in the art as a computer, but broadly refers to a processor, a microprocessor, a microcontroller, a programmable logic controller, an application specific integrated circuit, and another programmable circuit, and these terms are used interchangeably herein.

Figure 2:
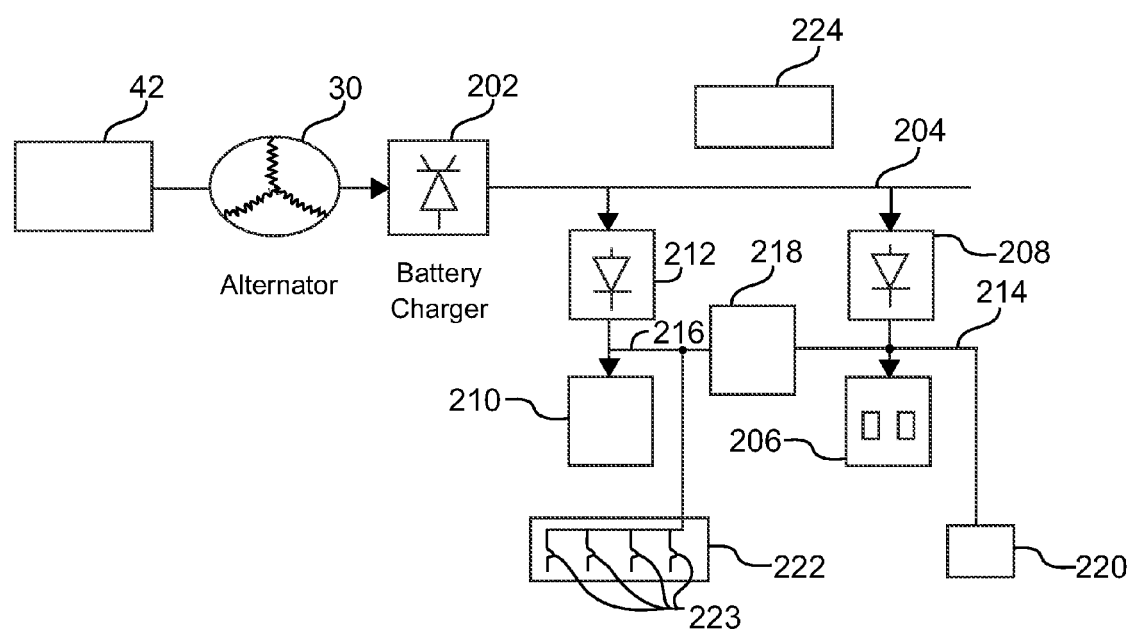
FIG. 2 is a simplified block diagram of a power supply management system that may be used with locomotive 10 shown in FIG. 1.

FIG. 2 is a simplified block diagram of a power supply management system 200 that may be used with locomotive 10 shown in FIG. 1. In the exemplary embodiment, power supply management system 200 includes a battery charger 202 configured to receive AC current from alternator 30 and generate a DC voltage sufficient to operate the electrical system on-board locomotive 10. A DC bus 204 is electrically coupled to battery charger 202. A first power source 206 is coupled to DC bus 204 through a diode 208. A second power source 210 is coupled to DC bus 204 through a diode 212. In some embodiments, power sources 206 and 210 are at equivalent voltages. In other embodiments, a voltage of one of power sources 206 and 210 is higher then the voltage of the other of power sources 206 and 210. For example, power source 206 may be rated to supply power at a nominal 72 Volts and power source 210 may be rated to supply power at a nominal 48 Volts. Of course the voltage output of power sources 206 and 210 may vary from nominal values depending on load and state of charge for a battery.

A cranking bus 214 is electrically coupled to power source 206 though appropriate switchgear (not shown) downstream from diode 208. An auxiliary bus 216 is electrically coupled to power source 210 though appropriate switchgear (not shown) down stream from diode 212. In the exemplary embodiment, cranking bus 214 and auxiliary bus 216 are coupled together using a semiconductor power transfer device 218. In an embodiment wherein the nominal voltages of power sources 206 and 210 are substantially equal, power transfer device 218 comprises a power diode such that when the voltage of power source 206 is less than the voltage of power source 210, the power diode conducts to facilitate supplying power to cranking bus 214 for cranking or for charging power source 206. In various embodiments, power source 206 and power source 210 have different output voltages and power supply management system 200 comprises a charging regulator coupled between power source 206 and power source 210. The charging regulator is configured to permit current flow from power source 210 at a second voltage to power source 206 at a first voltage while substantially preventing current flow from power source 206 to power source 210. When the first voltage is higher than the second voltage the charging regulator is configured to increase the voltage supplied by power source 210 to a voltage greater than or equal to the voltage of power source 206.

In an embodiment wherein the nominal voltages of power sources 206 and 210 are substantially different, power transfer device 218 comprises a regulator/converter configured to match voltages between power sources 206 and 210 such that the regulator/converter facilitates permitting current flow from second power source 210 at a second voltage to first power source 206 at a first voltage while substantially preventing current flow from first power source 206 to second power source 210 for supplying power to cranking bus 214 for cranking or for charging power source 206.

An engine starter 220 is electrically coupled to cranking bus 214 and mechanically coupled to engine 42 to facilitate starting of engine 42. A plurality of loads 222, which may be individual loads or bused loads are electrically coupled to auxiliary bus 216. In one embodiment, loads 222 comprise loads that are ganged to common breakers 223 according to their relative importance to maintaining locomotive 10 in a ready to run state. After engine 42 is secured, alternator 30 no longer provides electrical energy to power sources 206 and 210 through battery charger 202. Power source 206 is maintained isolated from any loads so that its state of charge and readiness is maintained in a high state. Power source 210 begins to deplete due to the loads remaining connected to power source 210 through auxiliary bus 216. A power system management system 224 is communicatively and/or electrically coupled to power source 210 and loads 222 to determine the state of charge of power source 210 and a discharge rate or load current of loads 222. In a case where power source 210 comprises a fuel cell, other electrochemical device, or internal combustion supply, power system management system 224 may determine a state of the device to continue supplying power to loads 222 rather than a state of charge. Power system management system 224 is configured to predict a length of time that power source 210 will be able to continue supplying power at a present rate of supplying the power. Power system management system 224 then automatically determines a sequence and timing for disconnecting loads from power source 210. Generally, the least essential loads are disconnected first and the most vital to supporting maintaining locomotive 10 in a ready to run state are disconnected last. When power sources 206 and 210 are embodied in a single unit, power system management system 224 is configured to disconnect all the loads prior to the state of the single unit power source decreases below what is needed to crank engine 42. When power sources 206 and 210 are embodied in separate units, as illustrated in FIG. 2, power system management system 224 may deplete power source 210 to a greater extent because power source 206 is maintained at a substantially fully charged state. Additionally, loads 222 may have individual loads ganged into buses such that loads of similar importance may be energized and deenergized together. In this manner, fewer breakers may be used to provide sequential disconnection of loads from power source 210.

In various embodiments, power sources 206 and 210 may comprise various combinations of power source types. For example, typical power source types for vehicles include batteries. However, various other power source types may be tailored to particular uses to provide robust power supply options. For example, power source 210 may be embodied using an "energy battery" that is configured for relatively high energy density and deep discharge, while power source 206 may be embodied using a "power battery" that is configured for relatively high power density and high current. Moreover, power source 210 may be embodied using a fuel cell that may be able to generate power for a longer time period than a storage battery. Further, power source 206 may be embodied using a supercapacitor alone or in combination with a battery to provide cranking power to starter 220.

During operation, when engine 42 is operating, alternator 30 supplies power to battery charger 202. Battery charger 202 converts the power supplied by alternator 30 to a voltage suitable for charging power sources 206 and 210, if necessary and for supplying auxiliary loads 222. If tractive force is not needed and locomotive 10 is stopped, a reverser handle (not shown) may be placed in a center position and engine 42 may continue to idle. If equipped with an automatic engine start/stop (AESS) system, engine 42 may be commanded to shutdown after a predetermined time of idling to conserve fuel. When engine 42 is shutdown, cranking power source 206 is isolated from any loads and is maintained in a fully charged condition. Power source 210 begins discharging if embodied using a storage battery. To extend a length of time that power source may be discharged, predetermined ones of loads 222 may be secured in a predetermined sequence, generally from least vital load to the most critical loads that will permit locomotive 10 to be started and pout in operation without having to receive assistance from off-board locomotive 10. In another embodiment, controller is further configured to transfer at least one auxiliary load from the non-essential bus to the essential bus prior to disconnecting the non-essential bus from the second power source. In some cases, power sources 206 and 210 may be embodied using a single power source or power sources 206 and 210 may be electrically coupled together. In such a case, power system management system 224 may sequentially disconnect all loads 222 from the power source prior to the power source reaching a state wherein the power source can not supply enough cranking power to start engine 42.

Figure 3:
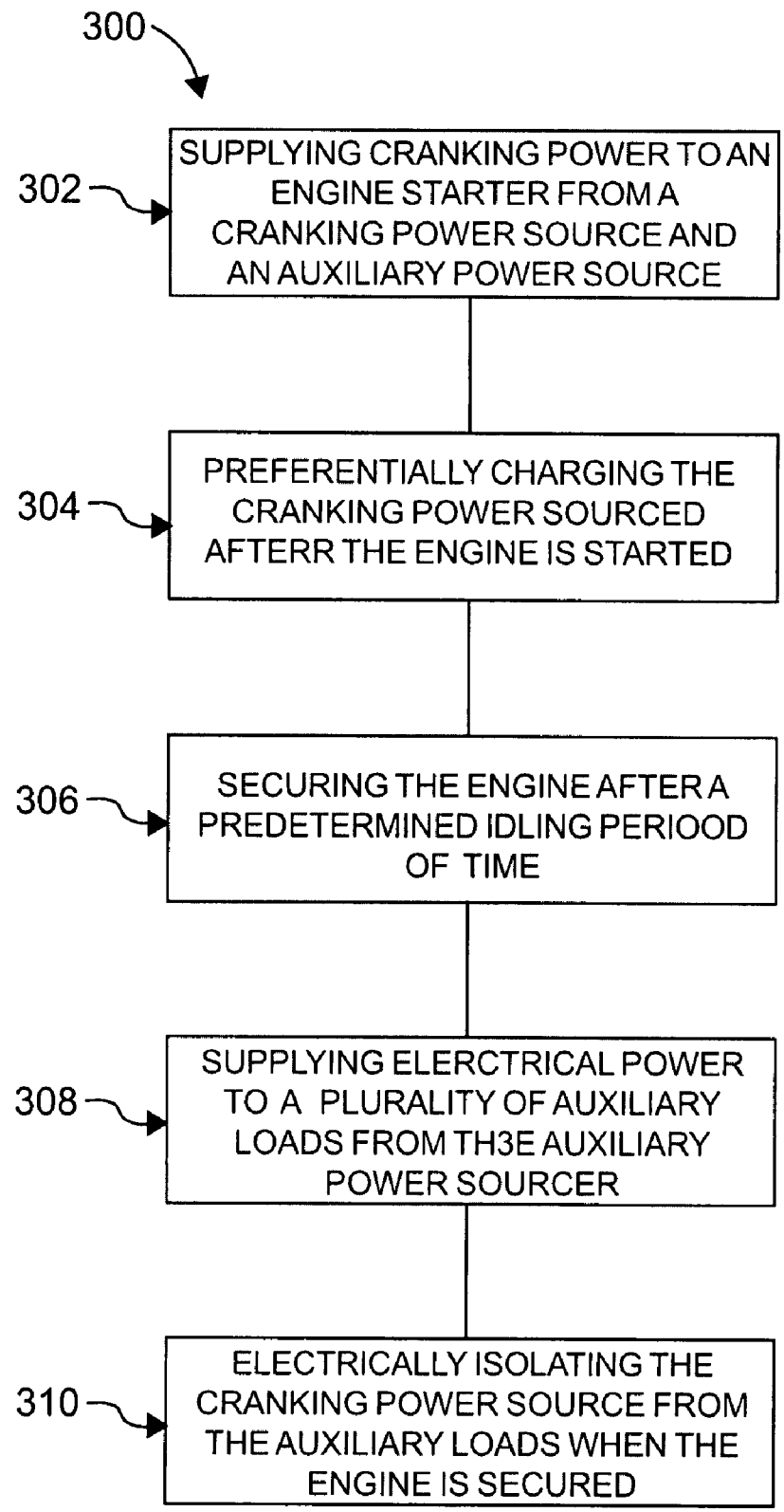
FIG. 3 is a flow chart of an exemplary method of managing a plurality of power sources.

FIG. 3 is a flow chart of an exemplary method 300 of managing a plurality of power sources. In the exemplary embodiment, method 300 includes supplying 302 cranking power to an engine starter from a cranking power source and an auxiliary power source and preferentially charging 304 the cranking power source after the engine is started. Method 300 also includes securing 306 the engine after a predetermined idling period of time and supplying 308 electrical power to a plurality of auxiliary loads from the auxiliary power source, and electrically isolating 310 the cranking power source from the auxiliary loads when the engine is secured.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is managing power sources to prevent or reduce the occurrence of road failures and maintain or extend equipment life. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and systems for managing power sources and extending equipment life are cost-effective and highly reliable. The methods and systems include determining a sate of charge of a power source and reducing load on the power source to ensure sufficient energy remains in the power source to start the engine. Accordingly, the methods and systems facilitate operating power sources in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. An energy management system for a vehicle comprising:
a first power source configured for cranking an engine, said first power source comprising a switch configured to electrically couple the first power source to a starter for the engine, said first power source electrically isolated from auxiliary onboard loads;
an essential bus connected to said first power source;
a second power source configured for supplying power to said auxiliary onboard loads;
a non-essential bus connected to said second power source;
a charging subsystem electrically coupled to said first and said second power sources, said charging subsystem configured to supply charging current to said first and said second power sources;
a power transfer device configured to selectively connect said essential bus and said non-essential bus; and
a controller configured to:
maintain said first power source in a substantially fully charged condition;
predict a length of time said second power source is capable of supplying power at a present determined rate to a non-essential onboard load;
determine a sequence and timing of disconnecting non-essential auxiliary onboard loads from said second power source;
supply power to said auxiliary onboard loads from said second power source and disconnect said non-essential auxiliary on-board load from said second power source using the determined sequence and timing; and
supply power to a portion of said auxiliary onboard loads through said essential bus from said second power source using said power transfer device and configured to supply power to a remaining portion of said auxiliary onboard loads through said non-essential bus and wherein said controller is further configured to disconnect said non-essential bus from said second power source after a predetermined amount of electrical discharge from said second power source.

2. A system in accordance with claim 1 wherein said controller is further configured to transfer at least one auxiliary load from the non-essential bus to the essential bus prior to disconnecting said non-essential bus from said second power source.

3. A system in accordance with claim 1 wherein said second power source is configured to supply power to portions of said auxiliary loads through a plurality of non-essential buses and wherein said controller is further configured to disconnect said non-essential buses from said second power source in a predetermined sequence and timing.

4. A system in accordance with claim 1 wherein said first and said second power sources comprise a combination of at least one of an energy battery configured for relatively high energy density, a power battery configured for relatively high power density, a supercapacitor, an electrochemical supercapacitor, and a fuel cell.

5. A system in accordance with claim 1 wherein said first power source comprises a combination of at least one of a power battery and a supercapacitor.

6. A system in accordance with claim 1 wherein said first and said second power sources have substantially similar output voltage, said system further comprising a charging diode coupled between said first and said second power sources, said charging diode configured to permit current flow from said second power source to said first power source while substantially preventing current flow from said first power source to said second power source.

7. A system in accordance with claim 1 wherein said first and said second power sources have different output voltages, said system further comprising a charging regulator coupled between said first and said second power sources, said charging regulator configured to permit current flow from said second power source at a second voltage to said first power source at a first voltage while substantially preventing current flow from said first power source to said second power source.

8. A system in accordance with claim 7 wherein said first voltage is higher than said second voltage and wherein said charging regulator is configured to increase the voltage supplied by the second power source to a voltage greater than or equal to the voltage of the first power source.

9. A method of managing a plurality of power sources, said method comprising:
supplying cranking power to an engine starter from a cranking power source connected to an essential bus and an auxiliary power source connected to a non-essential bus;
preferentially charging the cranking power source after the engine is started;
selectively connecting said essential bus and said non-essential bus through said power transfer device;
securing the engine after a predetermined idling period of time;
supplying power to a portion of a plurality of auxiliary onboard loads through said essential bus from the auxiliary power source using said power transfer device and supplying power to a remaining portion of the plurality of auxiliary onboard loads through said non-essential bus;
predicting a length of time said auxiliary power source is capable of supplying power at a present determined rate to the plurality of non-essential auxiliary onboard loads;
determining a sequence and timing of disconnecting the non-essential auxiliary onboard loads from the auxiliary power source;
disconnecting the plurality of non-essential auxiliary onboard loads from the auxiliary power source using the determined sequence and timing; and
electrically isolating the cranking power source from the auxiliary loads when the engine is secured.

10. A method in accordance with claim 9 further comprising when the engine is secured, charging the cranking power supply from the auxiliary power source.

11. A method in accordance with claim 10 wherein the at least one non-essential bus comprises a plurality of non-essential buses, said method further comprising disconnecting the plurality of non-essential buses from the auxiliary power source is a predetermined sequence based on at least one of a predetermined amount of discharge from the auxiliary power source and a predetermined amount of time.

12. A method in accordance with claim 9 wherein the onboard auxiliary loads comprise an essential bus and at least one non-essential bus, said method further comprising when the engine is secured, disconnecting the at least one non-essential bus from the auxiliary power source after at least one of a predetermined amount of discharge from the auxiliary power source and a predetermined amount of time.

13. A train locomotive comprising:
an engine;
an energy management system comprising:
a first power source comprising a cranking power source configured to supply cranking power to an engine starter and comprising a switch configured to electrically couple the first power source to a starter for the engine, said first power source electrically isolatable from auxiliary onboard loads;
an essential bus connected to said first power source;
a second power source comprising an auxiliary power source configured to supply electrical power to a non essential bus and an essential bus and configured for supplying power to said auxiliary onboard loads;
a non-essential bus connected to said second power source;
a charging subsystem electrically coupled to said first and said second power sources, said charging subsystem configured to supply charging current to said first and said second power sources;
a power transfer device configured to selectively connect said essential bus and said non-essential bus; and
a controller coupled to said first and said second power sources, said controller programmed to:
predict a length of time said second power source is capable of to supply power at a present determined rate to a non-essential onboard load;
determine a sequence and timing of disconnecting non-essential auxiliary loads from the essential bus;
disconnect at least one of the non essential bus and the essential bus from a respective one of said essential and said non-essential buses after at least one of a predetermined time and a predetermined condition of at least one of said essential and said non-essential buses when the engine is not operating;
supply power to a portion of said auxiliary onboard loads through said essential bus from said second power source using said power transfer device and configured to supply power to a remaining portion of said auxiliary onboard loads through said non-essential bus and wherein said controller is further configured to disconnect said non-essential bus from said second power source after a predetermined amount of electrical discharge from said second power source.

14. A locomotive in accordance with claim 13 wherein said auxiliary power source is configured to supply power to said cranking power source when the engine is not operating.

15. A locomotive in accordance with claim 13 wherein said auxiliary power source comprises a fuel cell.

16. A locomotive in accordance with claim 13 wherein said cranking power source comprises at least one of a battery and a supercapacitor.

17. A locomotive in accordance with claim 13 wherein said non-essential bus comprises a plurality of loads and wherein said controller is programmed to disconnect at least some of the plurality of loads from the non-essential bus in sequence based on at least one of a predetermined time and a predetermined power source condition when the engine is not operating.

\* \* \* \* \*